United States Patent [19]
Haupt

[11] 3,812,592

[45] May 28, 1974

[54] VEHICLE WHEEL ALIGNMENT CHECKING APPARATUS

[76] Inventor: Hans O. Haupt, 4509 N. Priscilla Ave., Indianapolis, Ind. 46226

[22] Filed: July 26, 1972

[21] Appl. No.: 275,341

[52] U.S. Cl. .......................................... 33/203.13
[51] Int. Cl. .............................................. G01b 5/25
[58] Field of Search ....... 33/203.13, 203.12, 203.14, 33/203

[56] References Cited
UNITED STATES PATENTS

| | | | |
|---|---|---|---|
| 1,609,996 | 12/1926 | Evans | 33/203.13 |
| 1,981,476 | 11/1934 | Statz | 33/203.13 |
| 2,114,481 | 4/1938 | Taber | 33/203.13 |
| 2,137,949 | 11/1938 | Phelps | 33/203.13 |
| 2,601,187 | 6/1952 | Volis | 33/203.13 |
| 3,411,346 | 11/1968 | Gagliardi | 33/203.13 |
| 3,453,740 | 7/1969 | Sakamoto | 33/203.13 |
| 3,643,337 | 2/1972 | Dick | 33/203.13 |

*Primary Examiner*—William D. Martin, Jr.
*Attorney, Agent, or Firm*—Woodard, Weikart, Emhardt & Naughton

[57] ABSTRACT

An apparatus for checking the alignment of the front wheels of a vehicle. A first and second platform are movably mounted to a frame with each platform receiving a front wheel of the vehicle. Each platform includes a pair of rollers, with one of the rollers of each platform being positively driven by an electric motor to rotate the vehicle wheel positioned on the platform. The first platform is movable in a lengthwise direction with respect to the vehicle whereas the second platform is movable in a lateral direction perpendicular to the lengthwise direction. An indicator is mounted to the frame and second platform to measure the amount of movement of the second platform to and from the first platform. One wheel of the vehicle is rotated by the rollers on the first platform and is pivoted until the wheel is aligned with respect to the first platform. The vehicle wheel on the first platform is then stopped, the steering wheel of the vehicle is fixed in place and the vehicle wheel on the second platform is rotated. The rollers of the platform may have a concave configuration or a constant diameter.

7 Claims, 7 Drawing Figures

PATENTED MAY 28 1974　3,812,592

VEHICLE WHEEL ALIGNMENT CHECKING APPARATUS

BACKGROUND OF THE INVENTION

1. Field of the Invention:

This invention is in the field of vehicle wheel alignment checking devices.

2. Description of the Prior Art:

A representable sample of the prior art is disclosed in the following U.S. Pats.:

2,877,560 issued to John F. Brown et al;
3,137,076 issued to Charles L. Hurst;
3,305,935 issued to Mark J. Cady et al;
3,411,346 issued to Romano Gagliardi;
3,546,782 issued to Joseph H. Pereue et al;
3,579,845 issued to Lee Hunter et al; and
3,587,325 issued to Lee Hunter et al.

The prior art devices are typically designed to determine caster, toe-in, camber and king pin inclination. As a result, the devices are quite complex requiring an auto mechanic to check the vehicle for alignment. Toe-in or the inward slanting of the wheel towards the front of the vehicle quite frequently is the cause for vehicle wheel misalignment as a result of the wheels impacting curbs and other pavement formations. There is a need for an apparatus which allows the vehicle operator to quickly check the toe-in of the front wheels of the vehicle. Disclosed herein is an apparatus wherein the operator of a vehicle may drive the vehicle onto the apparatus for quickly checking toe-in of the front wheels.

SUMMARY OF THE INVENTION

One embodiment of the present invention includes an apparatus for indicating alignment of the front wheels of a vehicle comprising a frame, a first platform connected to the frame for supporting one front wheel of the vehicle and having a first driver for rotating the one front wheel, a second platform movably mounted on the frame for supporting the other front wheel of the vehicle, the second platform having a second driver for rotating the other front wheel, and indicating means on the frame and the second platform operable to indicate the amount of horizontal movement of the second platform in the first direction to and from the first platform.

It is an object of the present invention to provide a new and improved apparatus for checking vehicle wheel alignment.

It is a further object of the present invention to provide an apparatus for allowing the quick and easy check of the toe-in angle of the front wheels of a vehicle.

Related objects and advantages of the present invention will be apparent from the following description.

DESCRIPTION OF THE PREFERRED EMBODIMENTS

Figure 1:
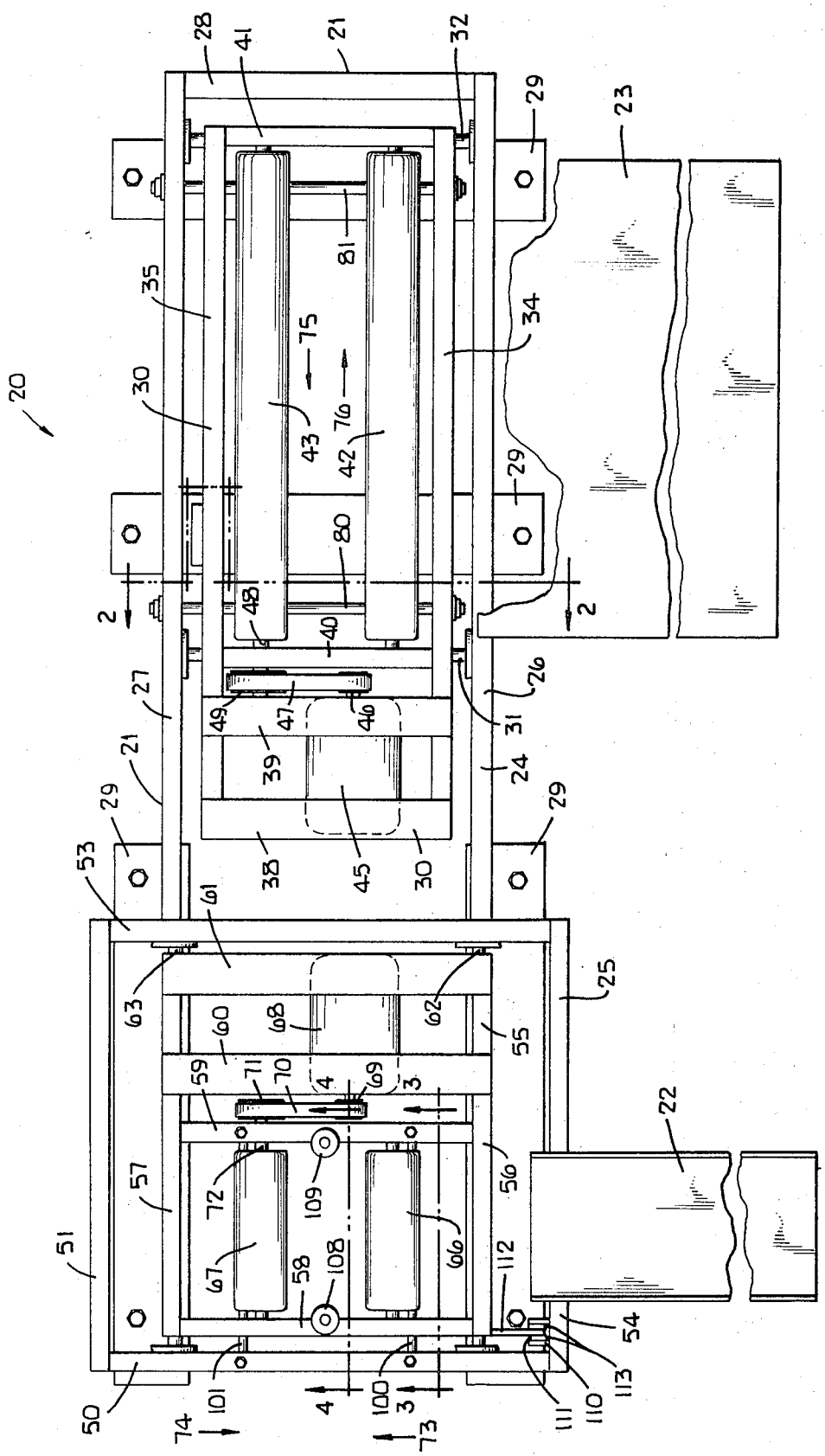
FIG. 1 is a fragmentary top view of an apparatus incorporating the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an apparatus 20 for indicating alignment of the front wheels of a vehicle. The apparatus includes a frame 21 which has a pair of ramps 22 and 23. Frame 21 also includes a generally elongated frame subassembly 24 which is integrally connected to another frame subassembly 25. Frame assemblies 24 and 25 are each provided with a plurality of rollers for receiving the front wheels of the vehicle which is driven up ramps 22 and 23 and onto rollers. Each frame subassembly is provided with a movably mounted platform upon which the rollers are rotatably mounted.

Figure 2:
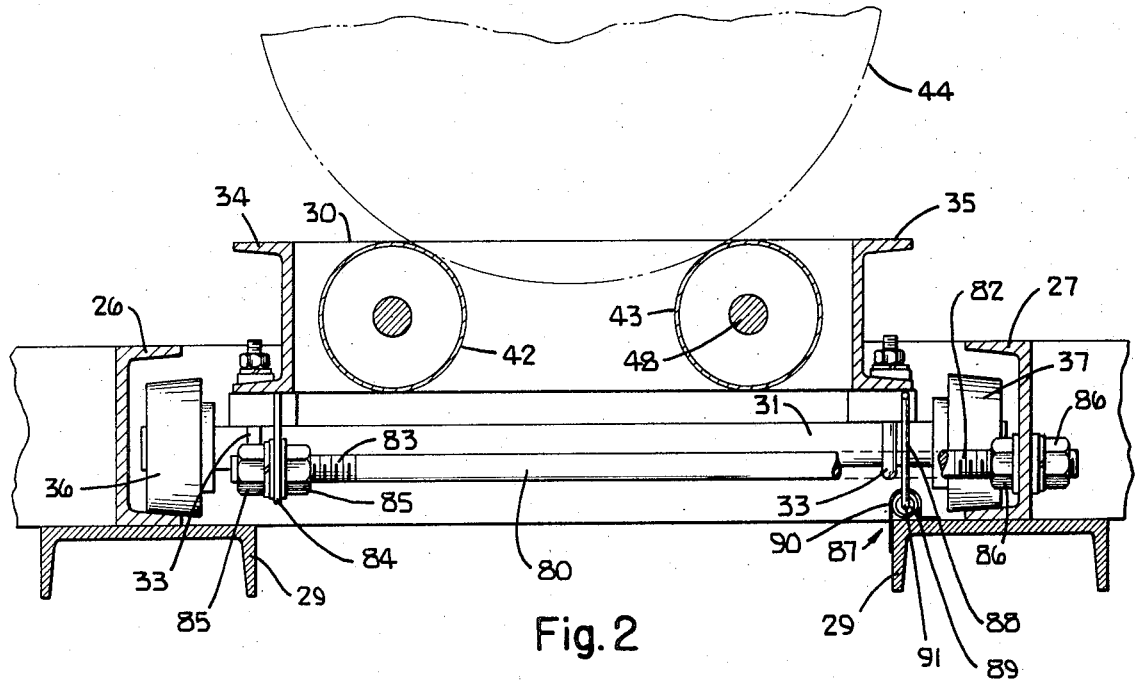
FIG. 2 is an enlarged fragmentary cross sectional view taken along the line 2—2 of FIG. 1 and viewed in the direction of the arrows.

Frame subassembly 24 has a pair of parallel beams 26 and 27 each of which has a C-shaped cross section. Beams 26 and 27 are integrally joined to frame subassembly 25 and across beam 28. Beams 26 and 27 (FIG. 2) are integrally mounted atop base beams 29. Platform 30 is of smaller size and fits within frame subassembly 24. Platform 30 includes a pair of rotatably mounted axles 31 and 32 with each axle having opposite ends with wheels mounted thereto which are rollable within beams 26 and 27. Axle 31 will now be described it being understood that a similar description applies to axle 32. Axle 31 is rotatably mounted by U-shaped clamps 33 (FIG. 2) which are fixedly mounted to C-shaped beams 34 and 35 of platform 30. Wheels 36 and 37 are rotatably mounted to axle 31 and roll respectively within beams 26 and 27. Beams 34 and 35 are integrally connected together by cross beams 38, 39, 40 and 41. A pair of wheel engaging rollers 42 and 43 are rotatably mounted to and between cross members 40 and 41. Rollers 42 and 43 are spaced apart sufficiently so as to receive the wheel 44 of the vehicle shown in FIG. 2 by the dashed lines.

An electric motor 45 is fixedly mounted to cross beams 38 and 39 and has an output shaft 46 which receives an endless belt 47. The axle 48 upon which roller 43 is mounted extends through member 40 and has a pulley wheel 49 mounted thereto which receives endless belt 47. Axle 48 positively engages roller 43 so as to prevent relative motion between axle 48 and roller 43. As a result, activation of motor 45 results in the rotation of output shaft 46, endless belt 47 and pulley wheel 49 as well as axle 48 and roller 43. Rotation of roller 43 thereby drivingly rotates wheel 44 which is supported by rollers 42 and 43. Roller 42 is freely rotatable on its axle.

Figure 4:
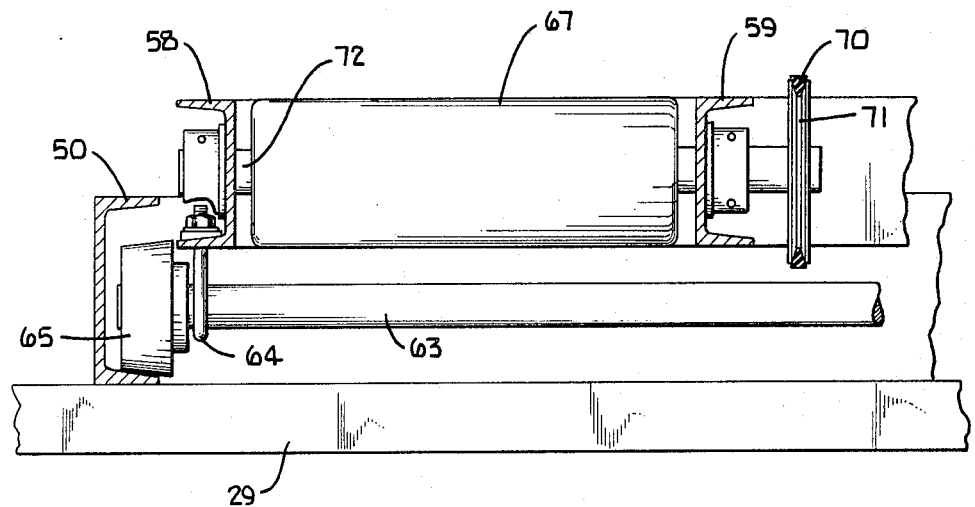
FIG. 4 is an enlarged fragmentary cross sectional view taken along line 4—4 of FIG. 1 and viewed in the direction of the arrows.

Frame subassembly 25 includes four beams 50, 51, 53 and 54 which are integrally joined together in a rectangular configuration with beam 53 being integrally joined to beams 26 and 27 of frame subassembly 24. A second platform 55 includes a pair of beams 56 and 57 which are integrally joined to beams 58 through 61 forming a generally rectangular platform which is movable within frame subassembly 25. Platform 55 is supported by a pair of axles 62 and 63 with wheels mounted to the opposite ends of each axle. The frame subassembly is mounted atop base support beams 29. Axles 62 and 63 are mounted to platform 55 in a manner similar to the mounting of axles 31 and 32 to platform 30. For example, axle 63 is rotatably mounted in U-shaped clamps 64 (FIG. 4) which are fixedly secured to beams 58 and 61. Wheels 65 are secured to the outer ends of axle 63 and are rollable within beams 50 and 53.

Platform 55 includes a pair of rollers 66 and 67 which are rotatably mounted to beams 58 and 59. Roller 66 is freely rotatable on platform 55 whereas roller 67 is driven by electric motor 68 fixedly mounted to beams 60 and 61. The output shaft 69 of motor 68 has a pulley wheel mounted thereon which drivingly engages endless belt 70 which is received by pulley wheel 71 mounted to the outer end of axle 72. Axle 72 is rotatably mounted to beams 58 and 59 and is in positive engagement with roller 67 so as to prevent relative motion between roller 67 and axle 72. Thus, activation of motor 68 will result in the rotation of roller 67 and the vehicle front wheel which is supported by rollers 67 and 66. Rotaton of roller 67 will result in rotation of the vehicle front wheel and in turn rotation of roller 66. Platform 55 will move the direction of arrow 73 or 74 whereas platform 30 will move in the direction of arrow 75 or 76.

Spring means which includes a pair of spring bars 80 and 81 are mounted to frame assembly 24 and platform 30. Spring bar 80 will now be described it being understood that a similar description applies to spring bar 81. End 82 (FIG. 2) of bar 80 is connected to beam 57 of the frame subassembly 24 whereas the opposite end 83 is connected to beam 34 of platform 30. Web 84 is fixedly secured to the bottom portion of beam 34 and extends downwardly. Bar 83 extends through web 84 and is secured thereto by a pair of nuts 85 which are threadedly received by the bar. Likewise, a pair of nuts 86 are threadedly received by end 82 of bar 80 thereby securing the bar to beam 27. Bars 80 and 81 are yieldable to allow limited horizontal movement of platform 30 in the direction of arrows 75 and 76.

Figure 5:
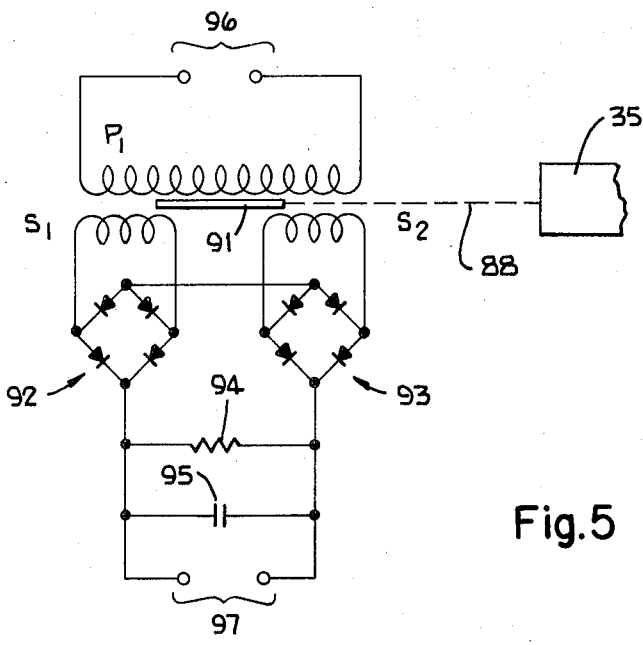
FIG. 5 is a schematic representation of the electrical circuitry connected to the detector 87 shown in FIG. 2.

A motion detector 87 (FIG. 2) is mounted atop base support member 29 and is operable to indicate the amount of lateral and horizontal movement of platform 30 in the direction of arrow 75 or 76 (FIG. 1). The motion detector includes a hollow tube 90 (FIG. 2) through which a steel core 91 is movable. Core 91 is mounted to push rod 88 which is fixedly secured to the bottom of beam 35. Core 91 is slidable in aperture 89 of tube 90 which includes primary winding P1 (FIG. 5) and secondary windings S1 and S2. A pair of bridge circuits 92 and 93 are connected across each secondary winding with the output of the bridge circuits connected across a discharge resistor 94 and load capacitor 95. By impressing a voltage across the input terminals 96, a differential voltage will appear across the output terminals 97 depending upon the location of core 91 with respect to the primary and secondary windings. Thus, movement of platform 30 to and from platform 55 may be measured by simply placing an electrical meter across the output terminals 97.

Figure 3:
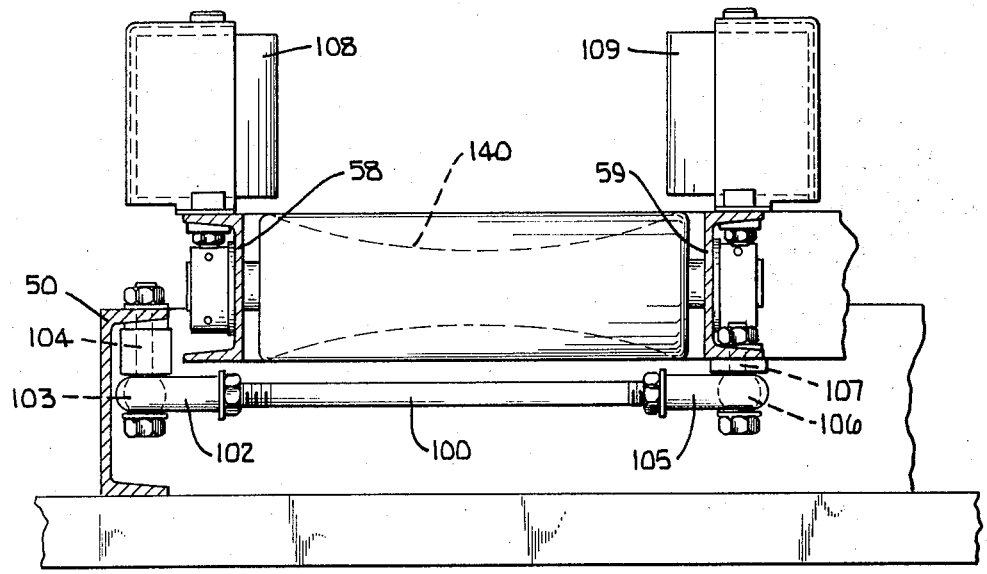
FIG. 3 is an enlarged fragmentary cross sectional view taken along the line 3—3 of FIG. 1 and viewed in the direction of the arrows.

In order to obtain accurate test results, it is necessary that platform 55 move along a line defined by arrow 73 and 74 which is always perpendicular to the line of movement of platform 30 in the direction of arrows 75 and 76. Therefore, platform 55 is connected to frame subassembly 25 by a pair of pivoting arms 100 and 101 (FIG. 1). Arm 100 will now be described it being understood that a similar description applies to arm 101. Arm 100 has a first end 102 (FIG. 3) which is provided with a rod end ball joint 103 through which pin 104 extends. Pin 104 is fixedly secured to beam 50. The opposite end 105 of arm 100 is provided with a similar pivoting ball connection 106 through which pin 107 extends. Pin 107 is fixedly secured to member 59. Arm 101 has a length identical to arm 100 and is pivotally connected to beams 50 and member 59 in a manner identical to that described for arm 100. As a result, as platform 55 moves in the direction of arrow 73 or 74, its line of movement will always be perpendicular to the line of movement of platform 30 as platform 55 is swingably mounted to frame subassembly 25 by arms 100 and 101 and rides on wheels mounted to axles 62 and 63, these wheels being received on the lower flanges of beams 50 and 53. The pivotal arms 100 and 101 insure that the rollers of the two platforms are in a parallel relationship. Beam 50 is provided with a plurality of apertures along the length thereof to receive pins 104 (FIG. 3) which extend into the ball bearing joints of the pivotal arms thereby allowing for repositioning of the pivotal arms along the length of beams. 50.

A pair of wheel side guides 108 and 109 are mounted to platform 55 between roller 66 and 67. Wheel guides 108 and 109 include rollers which are rotatably mounted to bars 58 and 59 of the platform with each roller protruding into the space between beams 58 and 59. The rollers of guides 108 and 109 extend upwardly above the platform so as to extend upwardly adjacent the side wall of the vehicle wheel.

In order to operate the apparatus for indicating the alignment of the front wheels of a vehicle, platform 55 is fixed with respect to the frame subassembly 25 so as to prevent relative movement in the direction of arrows 73 or 74 with respect to the second platform 30. This is accomplished by actuating brake 110 mounted to beam 54. Brake 110 has a slot 111 through which wall 112 is movable. Wall 112 is fixedly attached to platform 55 and moves therewith. A pair of pistons 113 are positioned on either side of slot 111 and may be forced against wall 112 by a suitable hydraulic or pneumatic system. Actuation of the hydraulic or pneumatic system forces the pistons 113 against wall 112 preventing relative movement between the brake and wall 112. After the front wheels of a vehicle are driven onto the rollers, brake 110 may be released so as to allow platform 55 to move. The vehicle is driven onto ramps 22 and 23 so as to position one front wheel atop rollers 66 and 67 and the other front wheel atop rollers 42 and 43. In the event that one front wheel is positioned ahead of or behind the other front wheel with respect to the vehicle, then platform 55 will move respectively in the direction of arrows 73 or 74 after the brake 110 is released. After platform 55 has reached a static position, motor 68 is actuated causing rotation of roller 67 which will thereby rotate the left front wheel of the vehicle. The steering wheel of the vehicle may then be turned until the electrical meter across output terminals 95 registers zero which would correspond to the core 91 being centered with respect to secondary windings S1 and S2. Of course, previously the meter has been marked with an appropriate scale whereby the zero mark is located at the position corresponding to core 91 being centered with respect to the secondary windings S1 and S2. The steering wheel should then be held or fixed in this position for the remainder of the test. That is, the steering wheel should be fixed in the position corresponding to the meter reading zero when the wheel roller 67 is rotated. Next, the brakes of the vehicle should be slightly applied and the meter once again read to determine the output of voltage across terminals 97. In the event that the left front wheel linkage is loose, then by applying the brakes slightly, platform 30 will be caused to move in the direction of arrow 75 or 76. Next, motor 68 is deactivated and the brakes are released. Motor 45 is then activated causing rotation of roller 43 and the right front vehicle wheel. The meter is then placed across output terminals 97 and the meter is read to determine if the wheels are aligned. Since the steering wheel is being held in a fixed position, the left front vehicle wheel is directed straight ahead. As a result, if the two front wheels of the vehicle are out of line, then the right vehicle wheel will cause the platform 30 to move in the direction of arrows 75 or 76. For example, if the right front wheel is pointed ahead and inward, then the wheel will tend to move lengthwise along rollers 42 and 43 causing the platform to move in the direction of arrow 76. On the other hand, if the right front vehicle wheel is turned outwardly, then the platform will be caused to move in the direction of arrows 75. The brakes are then slightly applied and the meter across the output terminal is read and compared with the reading taken without the brakes applied and with motor 45 activated to determine if the right front wheel linkage is loose.

Guides 108 and 109 (FIG. 1) are spaced apart the approximate width of the vehicle wheel thereby preventing the wheel from moving laterally on platform 55. Likewise, ramp 22 is provided with a width slightly greater than the width of the tire thereby allowing the left vehicle wheel to be aligned with the platform as the vehicle is driven on to the apparatus.

It should be noted that the front rollers of each platform are positively driven so that the vehicle wheels will not disengage the platform during the braking steps. Since different vehicles are provided with different amounts of toe-in or different amounts of inward slanting of the wheel towards the front, it is desirable to provide for different amounts of movement of platform 30. Thus, spring bars 80 and 81 are threaded rods thereby allowing for the attachment of platform 30 at the outermost end of the spring rods for maximum movement of toe-in whereas the platform may be secured to the spring rods inwardly of the outermost ends of the rods thereby allowing for minimum amount of movement of minimum amount of toe-in. The spring rods will return the platform to the zero position or to the position where the movable core is centered with respect to the primary and secondary windings of the detector.

Figure 6:
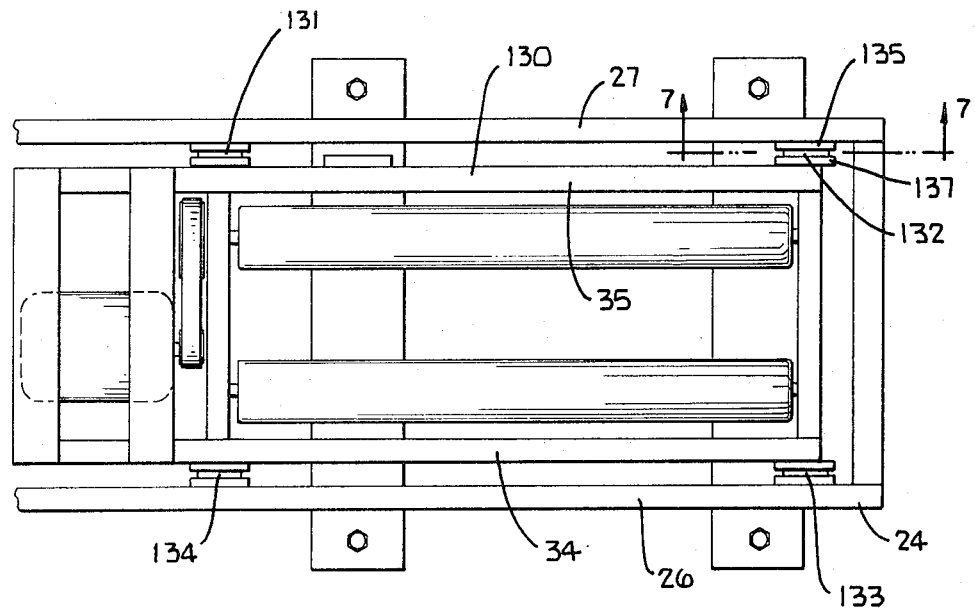
FIG. 6 is a fragmentary top view of the right half portion of FIG. 1 only showing an alternate embodiment.

An alternate embodiment of platform 30 connected to frame subassembly 24 is shown in FIG. 6 as platform 130 which is identical to platform 30 with the exception that platform 130 is supported by pivot links 131, 132, 133 and 134 in lieu of axles and wheels. In addition, spring bars 80 and 81 are not utilized.

Figure 7:
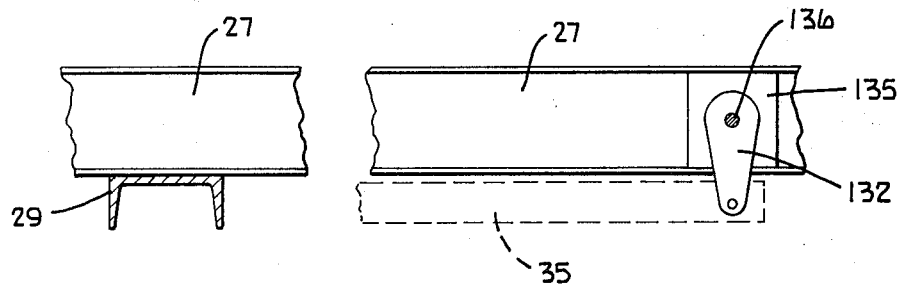
FIG. 7 is an enlarged fragmentary cross sectional view taken along the line 7—7 of FIG. 6.

Platform 130 includes two blocks fixedly attached to beam 35 and two blocks fixedly attached to beam 34 for pivotally receiving the bottom ends of links 131 through 134. Likewise, beam 26 has two blocks fixedly attached across from links 133 and 134 and beam 27 has two blocks fixedly attached across from links 131 and 132. The top ends of the links are pivotally attached to the blocks on beams 26 and 27. For example, the top end of link 132 (FIG. 7) is pivotally attached to block 135 mounted to beam 27 whereas the bottom end of link 132 is pivotally attached to block 137 mounted to beam 35. Platform 130 is therefore swingably mounted having a pendulum like motion. Platform 130 is lower in elevation than frame subassembly 24.

Rollers 66 and 67 of platform 55 may have a concave configuration 140 (FIG. 3) in lieu of a constant outside diameter. By having concave rollers 66 and 67, the left front vehicle wheel will automatically become aligned with platform 55 when roller 67 is rotated thereby alleviating the necessity for the operator to align the left front wheel with the platform 55.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An apparatus for indicating alignment of the front wheels of a vehicle comprising:
    a frame;
    a first platform connected to said frame for supporting one front wheel of said vehicle and having a first driver for rotating said one front wheel, said first platform being movable horizontally in a longitudinal direction perpendicular to the rotational axis of the first driver;
    a second platform movably mounted on said frame for supporting the other front wheel of said vehicle, said second platform having a second driver for rotating said other front wheel, said second platform being linearly movable in a lateral direction parallel to the axis of rotation of said second driver; and indicating means on said frame and operable to indicate the amount of horizontal movement of one of said platforms in the lateral direction with respect to said frame.

2. The apparatus of claim 1 and further comprising:

spring means connected to said frame and said second platform and yieldable to allow limited horizontal movement of said second platform in a lateral direction;

said first driver including a rotatably driven first roller mounted on said first platform which is engageable with said one wheel; and said second driver including a rotatably driven second roller mounted on said second platform which is engageable with said other wheel.

3. The apparatus of claim 2 wherein:

said spring means includes a spring bar extending in the longitudinal direction with a proximal end fastened to said frame and a distal end secured to said second platform.

4. The apparatus of claim 3 and further comprising:

clamp means mounted on said frame and engageable with said first platform being operable to prevent movement in longitudinal direction of said first platform.

5. The apparatus of claim 1 wherein:

said first platform includes a plurality of links pivotally mounted thereto, said links movably connecting said first platform to said frame and controlling longitudinal movement of said platform in a parallel fashion with respect to the machine.

6. The apparatus of claim 2 wherein:

said first and second roller of said first platform has a concave configuration.

7. The method of indicating wheel alignment of the front wheels of a vehicle comprising the steps of:

supporting one front wheel on a first platform and eliminating any longitudinal net force component on the one front wheel;

supporting the other front wheel on a second platform and eliminating any net longitudinal force component on the other front wheel;

indicating a first lateral position of the other front wheel;

rotating said supported one wheel and indicating any change of lateral position of the other front wheel and changing its steering direction by operating the steering mechanism to return the indication to said first position so that no side force is generated on the other front wheel;

holding the steering mechanism in the position at which no side force is generated on said other front wheel, and then stopping rotation of said one wheel;

rotating said other wheel and indicating any change from said first position.

* * * * *